United States Patent
Ganesan et al.

(10) Patent No.: US 10,104,621 B2
(45) Date of Patent: Oct. 16, 2018

(54) POWER EFFICIENT PACKET DETECTION

(71) Applicant: TEXAS INSTRUMENTS INCORPORATED, Dallas, TX (US)

(72) Inventors: Raghu Ganesan, Bangalore (IN); Karthik Ramasubramanian, Bangalore (IN); Sarma S. Gunturi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 144 days.

(21) Appl. No.: 14/972,959

(22) Filed: Dec. 17, 2015

(65) Prior Publication Data

US 2017/0181097 A1   Jun. 22, 2017

(51) Int. Cl.
| | |
|---|---|
| *H04L 12/16* | (2006.01) |
| *H04W 52/02* | (2009.01) |
| *H04L 1/00* | (2006.01) |
| *H04L 5/00* | (2006.01) |
| *H04L 27/38* | (2006.01) |
| *H04W 4/70* | (2018.01) |
| *H04W 84/12* | (2009.01) |

(52) U.S. Cl.
CPC ....... *H04W 52/0261* (2013.01); *H04L 1/0045* (2013.01); *H04L 5/0007* (2013.01); *H04L 27/38* (2013.01); *H04W 4/70* (2018.02); *H04W 84/12* (2013.01); *Y02D 70/00* (2018.01); *Y02D 70/142* (2018.01)

(58) Field of Classification Search
CPC ........ H04B 1/005; H04B 1/30; H04B 1/0082; H04L 25/026; H04L 2027/0022
See application file for complete search history.

(56) References Cited

U.S. PATENT DOCUMENTS

| | | | | |
|---|---|---|---|---|
| 2006/0062331 | A1* | 3/2006 | Shirazi | H03D 3/007 375/326 |
| 2014/0177764 | A1* | 6/2014 | Tetzlaff | H04L 27/06 375/343 |
| 2015/0349999 | A1* | 12/2015 | Kobatake | H04L 27/2657 370/343 |
| 2016/0295447 | A1* | 10/2016 | Braun | H04W 28/0221 |
| 2016/0381643 | A1* | 12/2016 | Arditti Ilitzky | H04W 52/02 370/311 |

* cited by examiner

*Primary Examiner* — Alvin Zhu
(74) *Attorney, Agent, or Firm* — Gregory J. Albin; Charles A. Brill; Frank D. Cimino

(57) ABSTRACT

Systems and methods are provided for packet detection in a wireless local area network transceiver. An antenna is configured to receive a signal, having a carrier frequency. A mixer is configured to mix the received signal with one of the in-phase and quadrature components of the local oscillator to produce a corresponding one of an in-phase downconverted signal and a quadrature phase downconverted signal. A packet detector is configured to determine, from the one of the in-phase downconverted signal and the quadrature phase downconverted signal, if the signal contains a packet of data and instruct a set of components associated with an other of the in-phase and quadrature components of the local oscillator to activate to process the received signal.

18 Claims, 4 Drawing Sheets

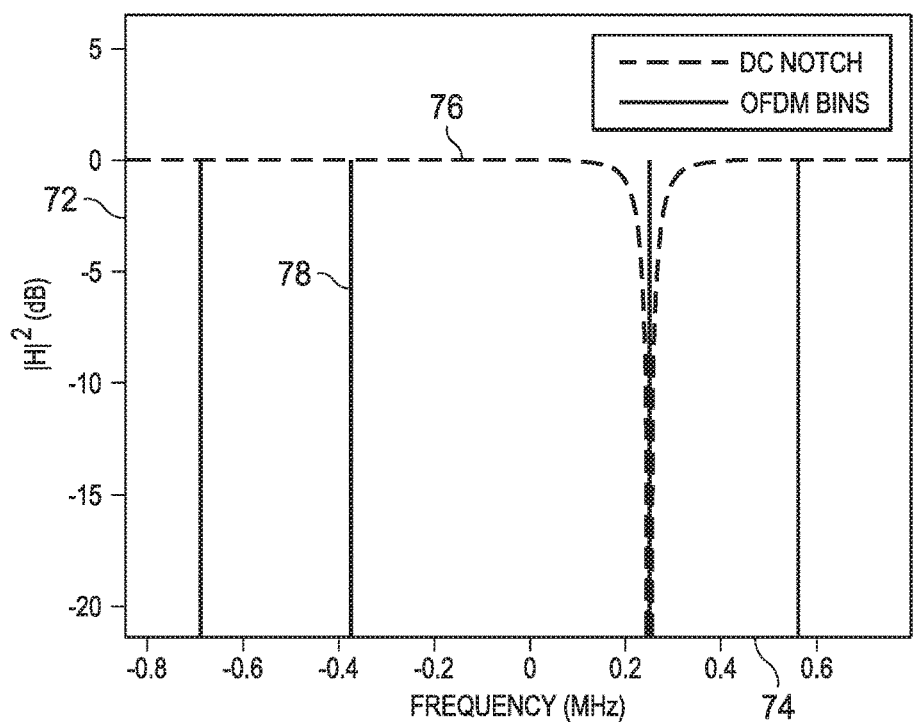
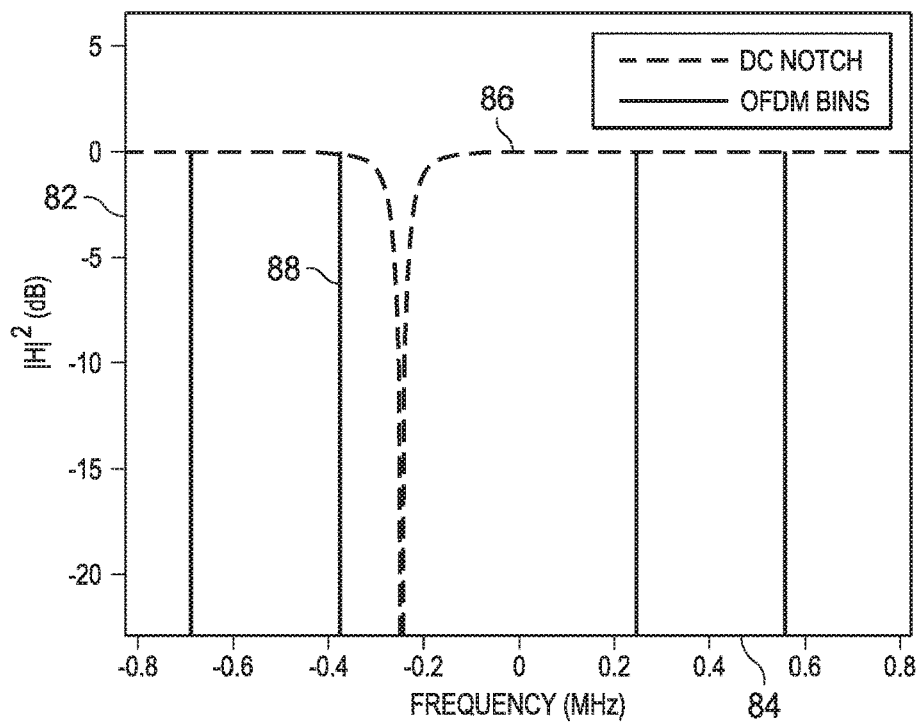

POWER EFFICIENT PACKET DETECTION

TECHNICAL FIELD

The invention relates generally to communication systems, and more specifically, to a power efficient method for detecting packets.

BACKGROUND

The "Internet of Things" (IoT) is the network of physical objects or "things" embedded with electronics, software, sensors and connectivity to enable it to achieve greater value and service by exchanging data with the manufacturer, operator and/or other connected devices. IoT is expected to offer advanced connectivity of devices, systems, and services that goes beyond machine-to-machine communications and covers a variety of protocols, domains, and applications. The interconnection of these embedded devices is expected to usher in automation in a number of fields. Experts estimate that the IoT will consist of almost fifty billion objects by 2020. One obstacle to widespread usage of these devices is that many devices are battery operated, and the data interconnectivity can represent significant power usage.

SUMMARY

In accordance with one example of the present invention, a system is provided for packet detection in a wireless local area network transceiver. An antenna is configured to receive a signal, having a carrier frequency. A mixer is configured to mix the received signal with one of the in-phase and quadrature components of the local oscillator to produce a corresponding one of an in-phase downconverted signal and a quadrature phase down-converted signal. A packet detector is configured to determine, from the one of the in-phase downconverted signal and the quadrature phase downconverted signal, if the signal contains a packet of data and instruct a set of components associated with an other of the in-phase and quadrature components of the local oscillator to activate to process the received signal.

In accordance with another example of the present invention, a method for detecting data packets is provided. A received signal is mixed with one of an in-phase signal and a quadrature signal from a local oscillator having a deliberate non-zero frequency offset from the carrier frequency that is significantly less than an associated bandwidth of the signal to provide a downconverted signal. A correlation is performed on the downconverted signal to produce a correlation value. It is determined that the received signal contains a packet of data if the correlation value exceeds a threshold value.

In accordance with yet another aspect of the present invention, a system is provided for packet detection in a wireless local area network employing an orthogonal frequency division multiplexing (OFDM) at an associated bin frequency. An antenna is configured to receive a signal, having a carrier frequency. A mixer is configured to mix the received signal with one of in-phase and quadrature phase signals from a local oscillator to produce a down-converted signal. The local oscillator has a deliberate non-zero frequency offset from the carrier frequency that is substantially equal to an odd multiple of the bin frequency. A filter is configured to remove image subcarriers from between the subcarriers of the downconverted signal that carry non-zero data. A packet detector is configured to determine, from the downconverted signal, if the signal contains a packet of data, and instruct a set of components associated with an other of the in-phase and quadrature-phase signals to activate to process the received signal.

BRIEF DESCRIPTION OF THE DRAWINGS

The features, objects, and advantages of the invention will become more apparent from the detailed description set forth below when taken in conjunction with the drawings, wherein:

FIGS. 3A and 3B illustrates a graphical example of mitigating a decrease in sensitivity due to alignment of a DC notch of a receiver with a subcarrier bin;

DETAILED DESCRIPTION

Power consumption is an important consideration for embedded wireless local area network (WLAN) transceivers, particular when embedded in electronic devices, as in an Internet of Things (IoT) style device. Excessive power consumption in such devices can lead to frequent battery replacements, which can degrade the user experience in a number of ways, including the inconvenience of the device being unavailable at times unpredictable to the user. In a WLAN system, the timing of the arrival of packets in not known a priori and a receiver (Rx) spends a substantial amount of time to determine the presence of a possible packet on air, with most of the current consumption contributed by the radio frequency (RF) analog front-end. It is not until a packet is detected that the rest of the modem circuitry is activated to decode the packet. Typically a WLAN transceiver remains in the receive mode most of the time awaiting packets addressed to the receiver. Therefore, any technique that successfully reduces power consumption in the receive mode can have a significant impact on the battery life of the transceiver and the associated device.

A WLAN packet with an orthogonal frequency division multiplex signal (IEEE802.11a/g/n) has a preamble portion called the Short Training Frame (STF). The STF is eight microseconds long and consists of ten repetitions of 0.8 microsecond long waveforms. A delayed self-correlation can be performed between consecutive repetitions of the waveform, with a packet detected when the correlation value exceeds a threshold. The carrier frequency offset between the transmitter and receiver can be estimated during the STF by the receiver and can be used to correct the phase offset in the correlation value and add the correlation values belonging to consecutive repetitions of the waveform. The sum of the correlation values belonging to consecutive repetitions of the waveform is compared against a threshold to detect the presence of a packet.

The inventors have determined a method and system for detecting WLAN packets while much of the circuitry in the RF analog front-end section is inactive to reduce the current consumption during the packet detection mode. Specifically, the inventors have determined that it is possible to utilize a single one of the in-phase and quadrature processing paths in the RF analog front-end to perform the packet detection. Once a packet has been detected, the other processing path can be activated for processing the received signal. The systems and methods taught herein avoid any aliasing that might otherwise complicate detection of the signal.

Figure 1:
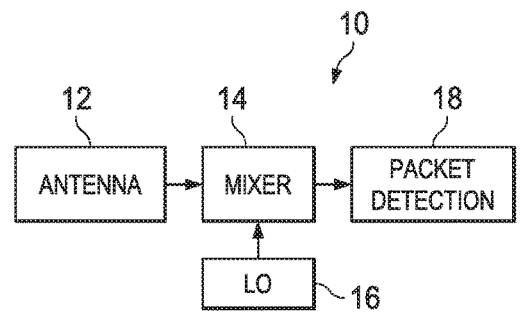
FIG. 1 illustrates one example of a system for detecting packets in a wireless local area network system.

FIG. 1 illustrates one example of a system 10 for detecting packets in a wireless local area network. It will be appreciated that, in one implementation, the system 10 can be implemented as one or more integrated circuit chips. The system 10 includes a receiver 12 configured to receive a signal at an expected frequency, for example, a center frequency of the signal. It will be appreciated that the receiver 12 can be part of a transceiver assembly associated with a network device. In one example, the signal is an orthogonal frequency division multiplex (OFDM) signal. In another example, the signal belongs to a single carrier system. The antenna 12 can have an associated low noise amplifier (not shown) to condition the signal for further processing.

A mixer 14 is configured to mix the received signal with one of the in-phase and quadrature components of a signal from a local oscillator (LO) 16 to produce a downconverted signal. The resulting signal can be provided to a packet detector 18, for example, after filtering and conversion to a digital signal at an analog-to-digital converter. It will be appreciated that, to conserve power, one and only one of in-phase and quadrature components can be downconverted, with the processing components associated with the other of the components being idle. Further, the local oscillator 16 can be configured to have a deliberate non-zero frequency offset from the expected frequency that is less than an associated bandwidth of the signal. By a "deliberate non-zero frequency offset," it is meant that the offset is substantially different from zero, such that it would be unlikely to occur as a natural variation in the ordinary operation of the system 10. In one implementation, in which the signal is an OFDM signal, the offset is selected to be in a range near an odd multiple of a bin frequency, or separation between subcarriers, of the OFDM signal. The resulting signal is centered at the offset frequency, as opposed to baseband. In an example of 802.11a/b/g/n WLAN system, the packet contains a preamble (STF) which can be used to detect the presence of the packet and timing synchronization. The short training frame (STF) contains non-zero values in every fourth subcarrier channel, and the inventors have determined that by providing an offset within a range defined by the bin frequency, the position of the "image frequencies" within the signal, that is, those subcarriers that fall on the opposite side of the normal center frequency from a nominal subcarrier of interest, can be shifted away from the corresponding subcarriers on the other side of the original center frequency. Specifically, since only one of in-phase and quadrature phase is used the signal on the frequency will fold on to the other sides. As a result, the subcarriers on the negative frequency will form image frequencies on the positive side of the normal center frequency and due to the offset in the center frequency will not fall on the subcarriers originally present on the positive and negative side of the normal center side of the normal center frequency.

Figure 2:
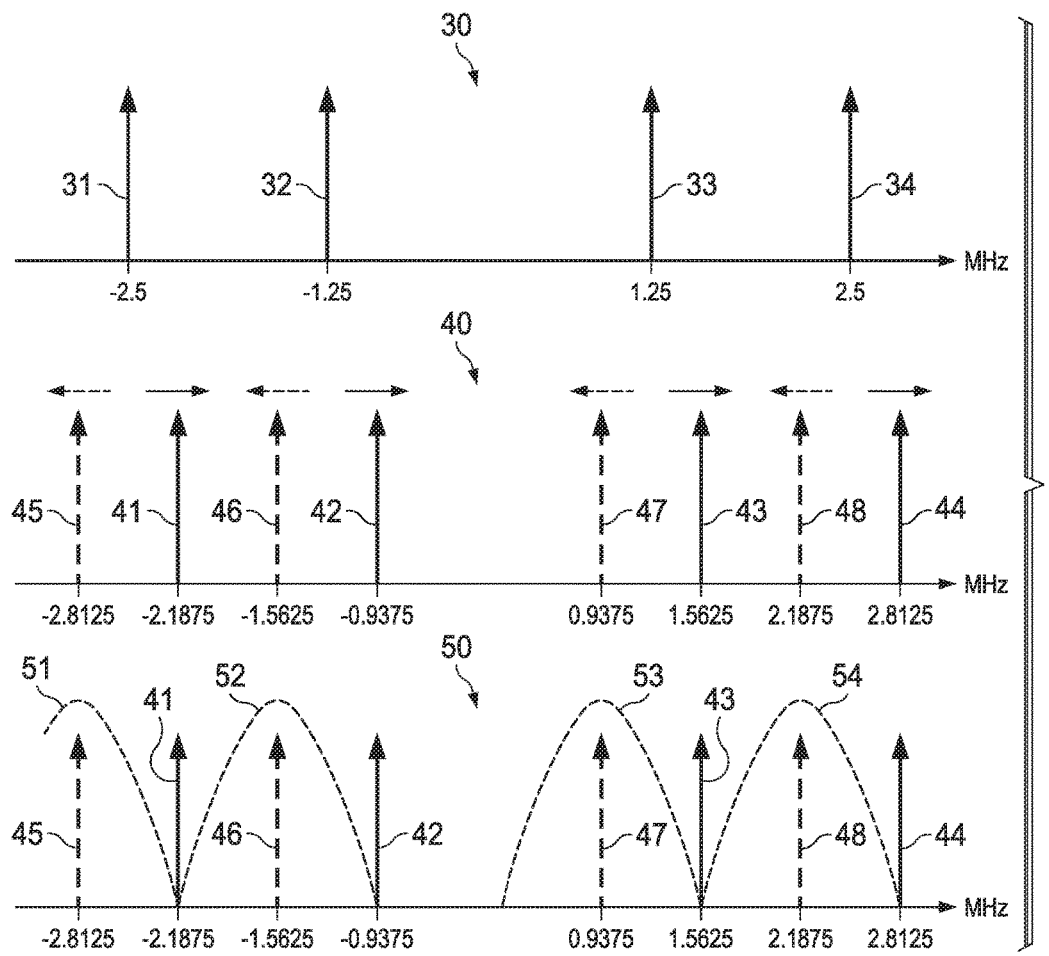
FIG. 2 illustrates a graphical example of the shift in subcarrier frequencies produced by the deliberate non-zero frequency offset of the local oscillator.

FIG. 2 illustrates a graphical example of the shift in subcarrier frequencies produced by the deliberate non-zero frequency offset of the local oscillator 16. In a first image 30, four subcarrier channels 31-34 having non-zero values are shown for a signal downconverted without the frequency offset. It will be appreciated that, in the illustrated short training frame of 802.11a/g/n, non-zero values are found only every fourth subcarrier channel. Accordingly, the illustrated subchannels are not separated by the bin frequency, which is about 312.5 kHz in an OFDM signal, but by four times that amount, or around 1.25 MHz. The first and second subchannels 31 and 32 are at frequencies 2.5 MHz and 1.25 MHz less than a center frequency of the downconverted signal, respectively, while the third and four subchannels 33 and 34 are at frequencies 1.25 MHz and 2.5 MHz greater than the center frequency. It will be appreciated, however, that the illustrated diagrams are idealized, and that some degree of non-intentional carrier frequency offset will be present due to a mismatch between the frequency reference at the transmitter and a local oscillator at the receiver. The subchannels are effectively mirror images of one another around DC, and significant aliasing of the signal can result if only one of the in-phase and quadrature signals are evaluated.

In a second image 40, corresponding subcarrier channels 41-44 are shown for a signal downconverted with a frequency offset equal to −312.5 kHz. While any of a number of deliberate non-zero offset frequency values can be used, the inventors have found that values substantially equal to odd multiples of the bin frequency are particularly useful. Via this offset, the difference between each subcarrier channel and the center frequency is altered, with the absolute difference between frequencies higher than the original center frequency being farther from the new center frequency, and the absolute difference between frequencies lower than the original center frequency being closer to the new center frequency. The image frequencies 45-48 associated with each subchannel move with their associated subcarrier channels 41-44, such that the image frequencies fall between the original subchannels.

In the illustrated example, the first and second subchannels 41 and 42 are at frequencies 2.1875 MHz and 0.9375 MHz less than the center frequency, respectively, while the third and four subchannels 43 and 44 are at frequencies 1.5625 MHz and 2.8125 MHz greater than the center frequency. It will be appreciated that the symmetry of the subchannels around the DC has been removed such that the image frequencies 45-48 corresponding to the subchannels 41-44 now fall between the subchannels if only one of the in-phase and quadrature phase signals is used after the downcoversion with the LO signal. As mentioned previously, the frequency spectrum is not the idealized regular configuration with images subcarriers interlaced between the original subcarriers, due to the presence of the unintentional frequency offset. The movement of original and image subcarriers moving in opposite direction makes the spectrum irregular and complicates the packet detection method. However, aliasing of the signal can be avoided, and data at one of the subchannels 41-44 or the image frequencies 45-48 can be readily filtered out, for example, via a comb filter. In a third image 50, a comb filter, having stopbands 51-54 spaced to coincide with the image frequencies 45-48, has been applied. It will be appreciated that the resulting filtered image will include only the subcarriers and have a noticeable reduction in noise relative to the original signal. It will be appreciated that the use of comb filter also rejects the noise between the original STF bins and improves the packet detection performance. In one implementation, in which the image frequencies 45-48 are retained, the comb filter can be configured to have the stopbands between the OFDM bins to attenuate noise between the subchannels.

In one implementation, the applied deliberate frequency offset for subsequent packets can be responsive to a determination of the unintentional frequency offset after the first packet. For example, there can be an unintentional offset between the center frequency of the transmitter of the received signal and the local oscillator at the receiver that is generally detected and accounted for after a first packet is detected. FIG. 3A, in a first graph 70 having a squared magnitude response in decibels on the vertical axis 72 and a frequency difference from a center frequency in megahertz on the horizontal axis 74, illustrates a situation in which a sum of the unintentional frequency offset and the deliberate frequency offset are close to a bin frequency, a DC notch 76 associated with the receiver can align with a subchannel 78, negatively impacting the sensitivity performance of the receiver. In this example (FIG. 3), the deliberate frequency offset is +250 KHz and the unintentional frequency offset is around 61 KHz. To avoid this decrease in sensitivity, the local oscillator frequency can be switched from high side injection to low-side injection, effectively reversing the signal of the deliberate non-zero frequency offset. FIG. 3B, in a second graph 80, also having a squared magnitude response in decibels on the vertical axis 82 and a frequency difference from a center frequency in megahertz on the horizontal axis 84, illustrates the result of changing the deliberate frequency offset from +250 KHz to −250 KHz. Switching from high side LO injection to low side, positions the receiver's DC offset away from the OFDM subchannels. Accordingly, the DC notch 86 is moved away from the subchannel 88 mitigating the loss of sensitivity. This is because the deliberate non-zero frequency offset makes the received STF spectrum non-symmetric over DC.

Returning to FIG. 1, a packet detector 18 is configured to determine, from the downconverted signal, if the signal contains a packet of data. The packet detection exploits the repetitive transmission of the short training sequence during the preamble to calculate a correlation term over a window of N samples, where N is an integer greater than one. In the illustrated implementation, a delayed self-correlation of the complex base-band received sequence is computed for a delay of 0.8 μs, which is thirty-two samples at a 40 MHz sampling frequency. A potential packet-on-air is declared if the magnitude of the correlation exceeds a predetermined threshold value.

Figure 4:
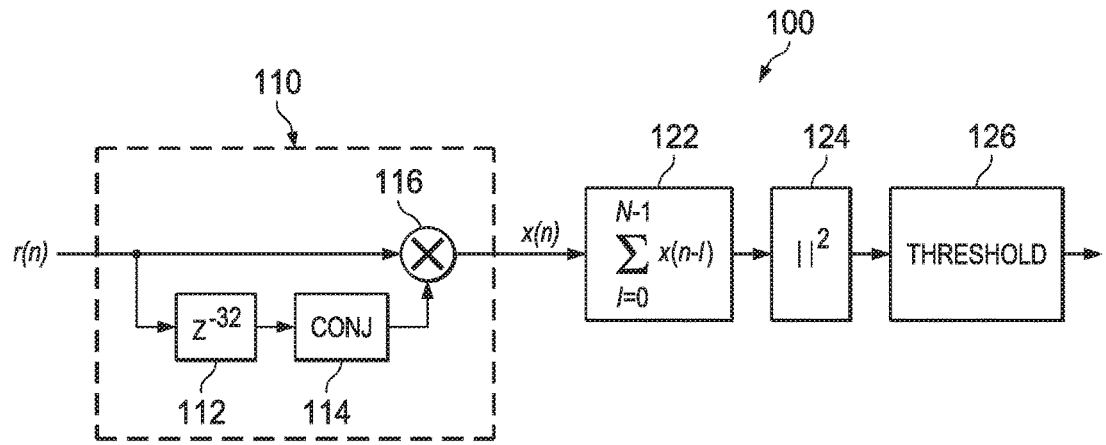
FIG. 4 illustrates one example of a packet detector assembly utilizing a delayed self-correlation.

FIG. 4 illustrates one example of a packet detector assembly 100 utilizing a delayed self-correlation. It will be appreciated that the packet detector assembly 100 can be implemented as an integrated circuit chip. The packet detector assembly 100 receives a signal, r(n), and provides the received signal to a correlation component 110 that compares the signal, r(n) to a delayed representation of the signal, r(n−32), to determine if a current set of thirty-two samples is substantially similar to a previous set, as would be expected in the WLAN OFDM preamble for a received packet. The correlation component includes a delay component 112. The delay component 112 delays the signal for thirty-two samples, the length of one of the repeated waveforms in the WLAN OFDM short form preamble. The delayed signal is then provided to a conjugate calculation component 114 that computes complex conjugates of the samples comprising the delayed signal. The each sample of the currently received signal is then multiplied by the corresponding computed complex conjugate of the delayed signal at a multiplier 116 to provide a correlation value, x(n).

The correlation value corresponding to multiple sets of delayed samples (of 0.8 microseconds) can be coherently summed with the aid of carrier frequency offset (CFO) estimation. The unintentional carrier frequency offset can be measured via a delayed self-correlation to determine small (e.g., of the order of parts per million) deviations from the carrier signal. The estimation of unintentional carrier frequency offset and coherent summing of multiple sets of delayed correlation are not shown in the figure. The correlation value is then summed across a predetermined number, N, of samples at a summing component 122 to produce a correlation sum. An accurate frequency offset estimation allows the correlation sum to grow in case of an actual packet reception. An energy calculation component 124 then calculates a squared magnitude of the correlation sum. The squared magnitude of the correlation sum is then compared to a threshold value at a thresholding component 126. If the correlation value exceeds the threshold value, a packet is considered to be detected and the system, including the one of the in-phase and quadrature paths that was not active during packet detection, is activated to decode the packet. Otherwise, the system continues listening for the packet.

Figure 5:
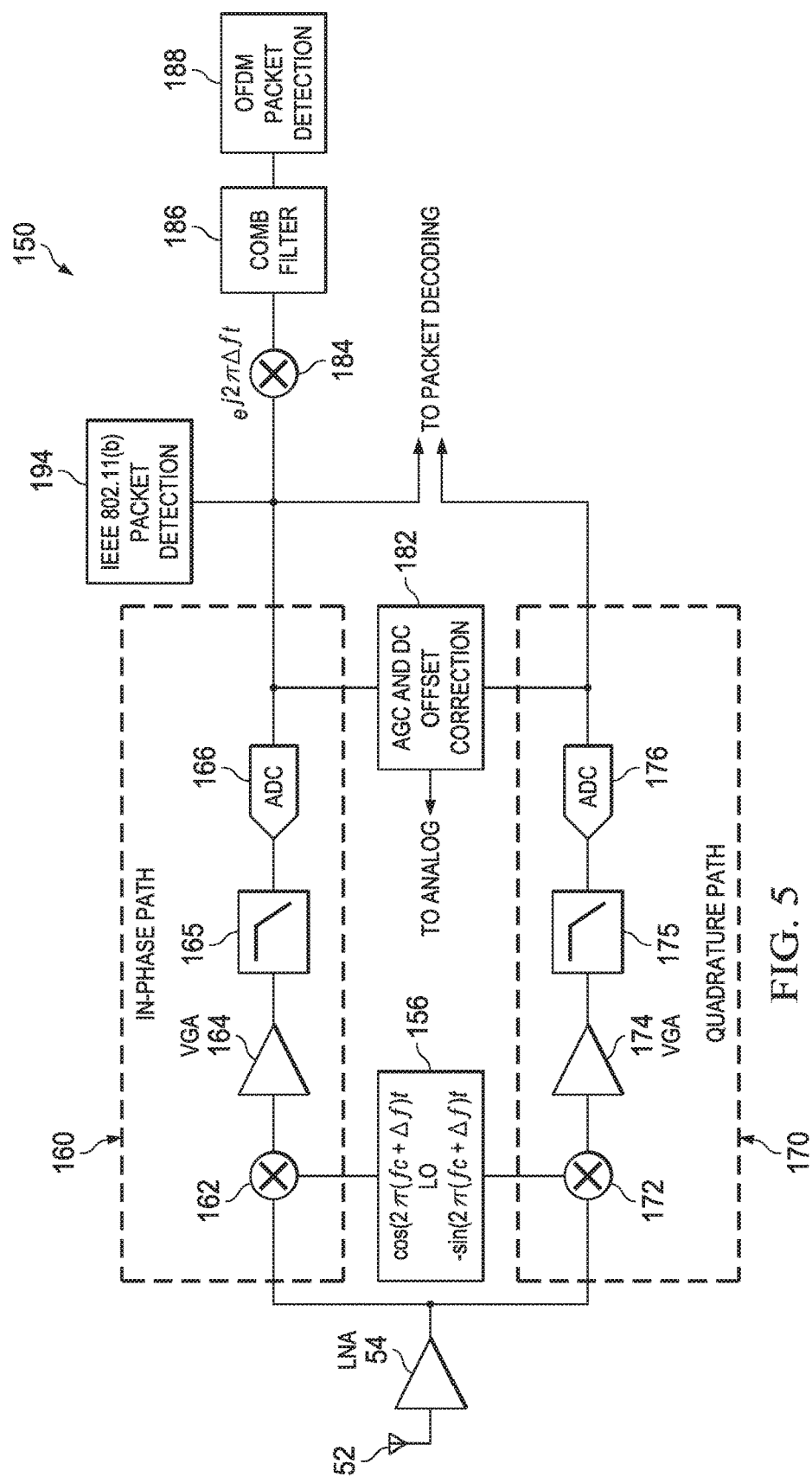
FIG. 5 illustrates one example of a wireless transceiver system utilizing efficient packet detection.

FIG. 5 illustrates one example of a wireless transceiver system 150 utilizing efficient packet detection. It will be appreciated that the wireless transceiver system 150, or one or more components of the system, can be implemented as an integrated circuit chip. The illustrated system 150 is a wireless LAN transceiver operating on the 802.11(g/a/n) standard and compatible with at least the 802.11(b) standard. The system 150 includes an antenna 152 connected to a low noise amplifier (LNA) 154 to provide a radio frequency (RF) signal having an associated carrier frequency. The RF signal is then provided to each of an in-phase path 160 and a quadrature path 170 for further processing. It will be appreciated, however, that during the packet detection, one of the in-phase path or the quadrature-path 170 can be deactivated to save power. Each path 160 and 170 receives a signal from a local oscillator 156 at respective mixers 162 and 172. The signal from the local oscillator 156 has a frequency substantially equal to that of the sum of the carrier frequency and a positive or negative offset. The signal, $LO_i$, provided from the local oscillator 156 to the in-phase path are offset by ninety degrees from the signal, $LO_q$, provided to the quadrature path such that:

$$LO_i = \cos\ [2\pi(f_c + f_\Delta)t]$$

$$LO_q = -\sin\ [2\pi(f_c + f_\Delta)t] \quad \text{Eq. 1}$$

where $f_c$ is a carrier frequency and $f_\Delta$ is a positive or negative offset.

The resulting downconverted signals are provided to respective variable gain amplifiers 164 and 174 to amplify the downconverted signals and respective low-pass filters 165 and 175 remove spurious demodulation products from the downconverted signals. The signals are then digitized at respective analog-to-digital converters (ADCs) 166 and 176.

The filtered signals are each provided to an automatic gain control and DC offset correction component 182. In the illustrated implementation, the in-phase signal is provided to a mixer 184 that down-converts the signal to zero-IF (intermediate frequency) and re-creates the quadrature component of the signal. Specifically, a signal, $e^{-j2\pi\Delta f t}$, can be provided to the mixer to remove the deliberate non-zero frequency offset. The image signals are attenuated using a filter 186, for example, with stopbands located in between the original signals, such that their center frequencies are separated by approximately four times the bin frequency. In one implementation, a comb filter 186 can be used to reject the image bins, which are placed between the original bins. A transfer function of the comb filter can be described as $$H(z) = ([1-z^{-D}]/[1-rz^{-D}])^N, \quad \text{Eq. 2}$$

where D refers to the delay (in our case the delay is equal to thirty-two samples with a sampling rate of forty-megahertz, r refers to pole radius, which controls the band-width of the notches in the comb filter, and N refers to the order of the filter.

It will be appreciated, however, that in an alternative implementation, the original signals could be filtered out, with the image signals used for OFDM packet detection. In another implementation, the comb filter 186 output can be subtracted to a delayed, matched input to get the image signals, which can be also down-converted and used for self-correlation. The self-correlation outputs of both positive and negative tones can be coherently added to improve the performance of the packet detector.

The filtered signal is provided to an OFDM packet detection component 88. The OFDM packet detection component 188 calculates a delayed self-correlation of the complex base-band received sequence with a delay of 0.8 μs, which is thirty-two samples at 40 MHz sampling frequency. In one implementation, during the reception of the short training frame, the automatic gain control 182 may also be adjusting the RF/analog gains, so the auto-correlation can be performed using the sign bits of the signal. A potential packet-on-air is declared if the magnitude of the correlation exceeds a predetermined threshold value. Once the packet is detected, the quadrature path 170 is activated to decode the packet. At this point, the outputs of the in-phase 160 and quadrature paths 170 are provided to a packet decoding system (not shown) for retrieval of the transmitted data.

In the illustrated implementation, the system 150 also allows for packet detection of packets belonging to single carrier modulated signals using an associated packet detector 194, with, the deliberate frequency offset aiding the detection of single carrier modulated packet with one of the in-phase or quadrature-path. The inventors have determined that a small frequency offset, that is, of a few kilohertz, in the in-phase path could result in slow varying envelope modulation in the in-phase path, which can hinder packet detection, as there are long periods of low signal energy. Using a larger frequency offset, for example, of the order of several hundred KHz, avoids this problem and assures reliable packet detection for single carrier modulated systems as well.

In the illustrated example, the packet detector is configured to detect packets modulated according to the 802.11(b) standard. The 802.11(b) standard, for a long preamble format, includes a physical layer convergence protocol preamble having a length of one hundred forty-four bits and a forty-eight bit header, each transmitted at a megabit per second using differential binary phase shift keying modulation. The preamble is spread by an eleven-chip Barker code. The 802.11b packet detector includes a correlator assembly configured to exploit the property of the Barker code to correlate the one of the in-phase downconverted signal and the quadrature phase downconverted signal with a reference waveform and determine that a packet from an 802.11(b) transmitter has been received when a magnitude of the correlation exceeds a threshold. Once a packet has been detected at the single carrier packet detector 194, the quadrature path 170 is activated to decode the packet.

One advantage of the illustrated system 150 is that the in-phase and quadrature portions of the short-training frame (STF) signal are regenerated in the digital base-band, despite the deactivation of the quadrature path 170. Aliasing of signals is avoided by the careful selection of frequency offset in LO and subsequently correcting it in digital base-band. The comb filter 186 can significantly reduce noise in the signal (e.g., of the order of three decibels for a first order comb filter (i.e., N=1 in the comb filter transfer function), allowing the system 150 to perform at a signal-to-noise level comparable to existing methods even without the use of the quadrature path 170. The stop band of the comb filter also rejects noise along with the image signals. In addition, since the in-phase and quadrature signals are re-generated, a conventional packet detection scheme can be used. The system 150 is robust to multi-path channels, is robust to automatic gain control convergence, and gives accurate detection of boundary between the short and long training sequences in the signal.

Figure 6:
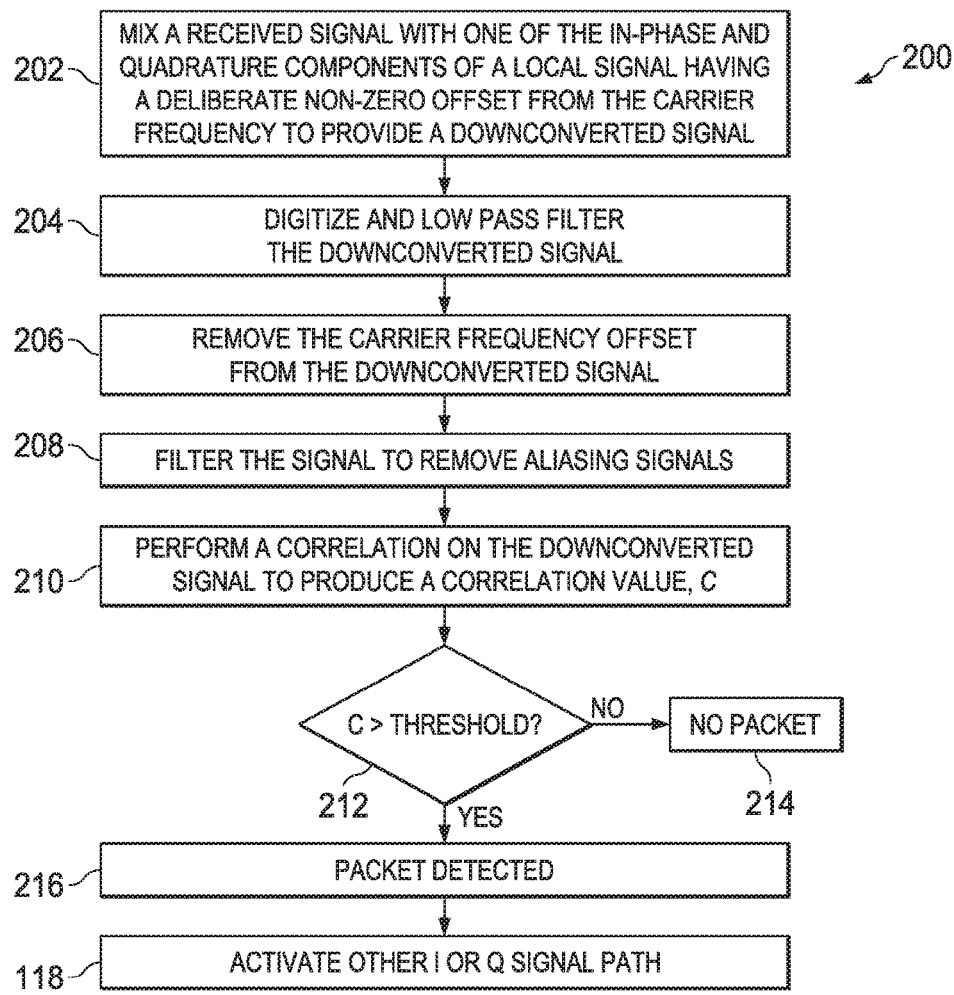
FIG. 6 illustrates a method for detecting packets with increased energy efficiency.

In view of the foregoing structural and functional features described above, methods in accordance with various aspects of the present invention will be better appreciated with reference to FIG. 6. While, for purposes of simplicity of explanation, the method of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 6 illustrates a method 200 for detecting packets with increased energy efficiency. At 202, a received signal is mixed with one of the in-phase and quadrature components of a local reference signal having a deliberate non-zero frequency offset from the carrier frequency that is less than an associated bandwidth of the signal to provide a down-converted signal. In one example, the in-phase component of the received signal is mixed with the offset signal and a quadrature path associated with the quadrature component of the signal is activated only after it has been determined that the received signal contains a packet of data. In this example, the received signal can be an orthogonal frequency division multiplexed (OFDM) signal having an associated bin frequency and carrying data in accordance with the 802.11(g/a/n) protocol. The deliberate non-zero frequency offset also aids the detection of packets with 802.11(b) protocol with one of the in-phase or quadrature path in the receiver, thus saving power consumption in the receive operation.

At 204, the downconverted signal is converted to a digital signal and low pass filtered to remove unwanted frequency content from the mixing at 202. At 206, the deliberate non-zero frequency offset is removed from the downconverted signal, for example, by mixing the downconverted signal with a signal at the offset frequency. At 208, the down-converted signal is filtered to remove image signals. For example, in a training frame, not all subcarriers may include non-zero data. The filtering can be performed via a comb filter configured to remove image signal between subcarriers of a short training frame carrying non-zero data. The image signal is a result of using only one of the in-phase and quadrature arms of the analog front end. At 210, a correlation is performed on the downconverted signal to produce a correlation value, C. In one implementation, the correlation is a delayed self-correlation that only uses the sign bits of the signal. At 212, it is determining if correlation value, C, exceeds a threshold value, T.

If the correlation value does not exceed the threshold value (N), it is determined that no packet is present and this instance of the method terminates at 214. If the correlation value exceeds the threshold value (Y), a potential data packet is reported at 216, and then one of the quadrature path and the in-phase path that was not utilized during packet detection is activated at 218 to allow for decoding of the packet data. To this end, a hardware component or a processor running appropriate software is configured to enable radio frequency, analog & digital components of the one of the quadrature path and the in-phase path that was not utilized during packet detection. Accordingly, both the quadrature path and the in-phase path are used in processing the packet data once the packet is detected. At the end of the packet decoding process, all the components related to the non-utilized path are deactivated to save power consumption during packet detection.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A system for packet detection in a wireless local area network system comprising:
    an antenna configured to receive a signal, having a carrier frequency and an associated bandwidth;
    a mixer configured to mix the received signal with one of in-phase and quadrature components of a local oscillator to produce a corresponding one of an in-phase downconverted signal and a quadrature phase downconverted signal; and
    a packet detector configured to determine, from the one of the in-phase downconverted signal and the quadrature phase downconverted signal, if the signal contains a packet of data and instruct a set of components associated with an other of the in-phase and quadrature components of the local oscillator to activate to process the received signal,
    wherein the received signal is an orthogonal frequency division multiplexed (OFDM) signal having subcarriers separated by a bin frequency of the signal, and
    wherein a non-zero frequency offset is introduced between the carrier frequency of the signal and the local oscillator, the non-zero frequency offset being an odd multiple of the bin frequency of the signal.

2. The system of claim 1, wherein the non-zero frequency offset is less than the associated bandwidth of the signal.

3. The system of claim 1, further comprising a filter configured to remove image signals from the one of the in-phase downconverted signal and the quadrature phase downconverted signal falling between the subcarriers of the OFDM signal to provide a filtered signal.

4. The system of claim 3, where the filter is a comb filter.

5. The system of claim 3, wherein the packet detector includes a correlator assembly that conducts at least one of an auto-correlation and a cross-correlation on the filtered signal and compares the resulting correlation value to a threshold to determine if a packet is likely to have been received.

6. The system of claim 5, wherein the packet detector is configured to recover the image signals, the mixer and the packet detector being configured to down-convert the image signals and use them in a correlation, with correlation results of the image signals and the filtered signal coherently added to improve performance of the packet detector.

7. The system of claim 1, further comprising a comb filter configured to attenuate noise between subcarriers of the OFDM signal.

8. The system of claim 1, wherein the packet detector includes a detector for packets belonging to a single carrier system, including a correlator assembly configured to correlate the one of the in-phase downconverted signal and the quadrature phase downconverted signal with a reference waveform and determine that a packet belonging to a single carrier system has been received when a magnitude of the correlation exceeds a threshold.

9. The system of claim 8, wherein the detector for packets belonging to the single carrier system is a 802.11(b) packet detector configured to determine if a packet has been received from a 802.11(b) transmitter.

10. The system of claim 8, wherein the detector for detecting packets belonging to the single carrier system is configured to instruct a set of components associated with the other of the in-phase and quadrature components of the local oscillator to activate to process the received packet.

11. The system of claim 2, wherein the mixer is a first mixer and the system further comprising a second mixer configured to remove the deliberate non-zero frequency offset from at least one of the in-phase downconverted signal and the quadrature phase downconverted signal before at least one of the in-phase downconverted signal and the quadrature phase downconverted signal is provided to the packet detector.

12. The system of claim 2, wherein the non-zero frequency offset can be determined according to a measured unintentional frequency offset between the local oscillator and the carrier frequency.

13. The system of claim 11, wherein the non-zero frequency offset is delivered via a low-side injection when a sum of a magnitude of the non-zero frequency offset and the unintentional frequency offset is within a selected range of values, and the non-zero frequency offset is delivered via a high-side injection when a sum of a magnitude of the non-zero frequency offset and the unintentional frequency offset is not near a first value.

14. A method for detecting packets, comprising:
    mixing a received signal with one of an in-phase signal and a quadrature signal from a local oscillator having a non-zero frequency offset from a carrier frequency that is less than an associated bandwidth of the signal to provide a downconverted signal, wherein the received signal is an orthogonal frequency division multiplexed (OFDM) signal having an associated bin frequency and the non-zero frequency offset is an odd multiple of the bin frequency of the signal;
    performing a correlation on the downconverted signal to produce a correlation value; and
    determining that the received signal contains a packet of data if the correlation value exceeds a threshold value.

15. The method of claim 14, wherein mixing the received signal with one of the in-phase and quadrature signal from the local oscillator comprises mixing the in-phase signal from the local oscillator with the received signal.

16. The method of claim 14, further comprising activating one of a quadrature path associated with the quadrature signal from the local oscillator and an in-phase path associated with the in-phase signal from the local oscillator only when it is determined that the received signal contains a packet of data, and deactivating the one of the quadrature path and the in-phase path after the received packet of data has been either decoded or determined not to be addressed to the receiver receiving the signal.

17. The method of claim 14, further comprising filtering the downconverted signal to remove image signals from between subcarriers of a short training frame carrying non-zero data before the correlation of the downconverted signal is performed.

18. A system for packet detection in a wireless local area network employing an orthogonal frequency division multiplexing (OFDM) at an associated bin frequency comprising:
- an antenna configured to receive a signal, having a carrier frequency;
- a mixer configured to mix the received signal with an in-phase signals from a local oscillator to produce a downconverted signal, the local oscillator having a non-zero frequency offset from the carrier frequency that is an odd multiple of the bin frequency;
- a filter configured to remove image signals from between the subcarriers of the downconverted signal that carry non-zero data; and
- a packet detector configured to determine, from the downconverted signal, if the signal contains a packet of data, and instruct a set of components associated with a quadrature path of the system to activate to process the received signal, the packet detector including a correlator assembly that conducts a correlation on the downconverted signal and compares the resulting correlation value to a threshold to determine if a packet is likely to have been received.

* * * * *